May 23, 1933.  E. D. SMITH  1,910,935
DENTAL APPLIANCE
Filed Sept. 4, 1931  3 Sheets-Sheet 2
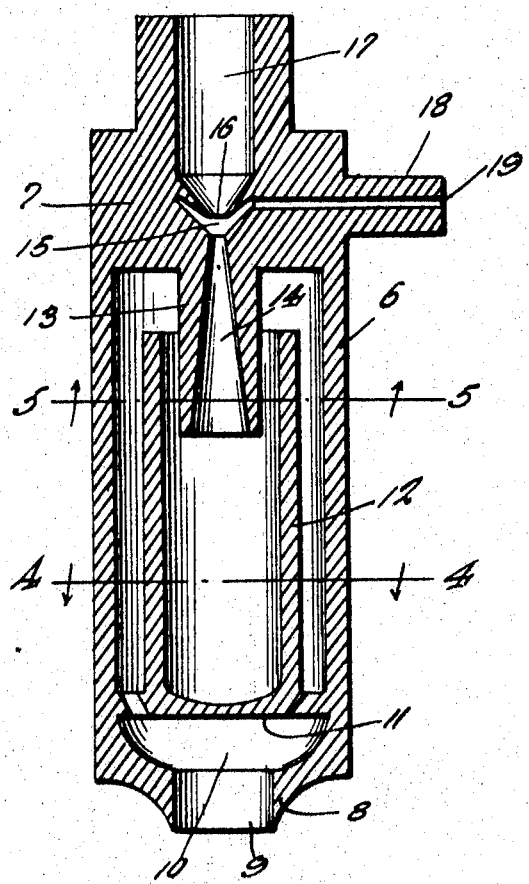
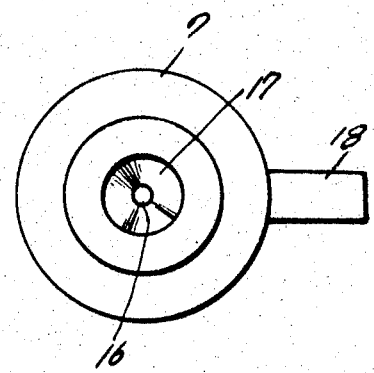
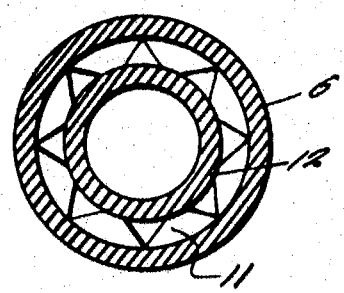
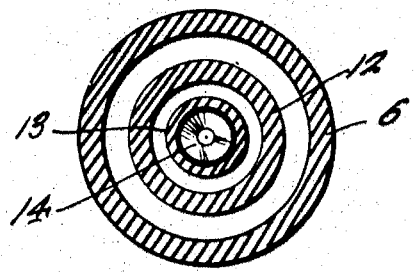
Inventor
Earl D. Smith
By Clarence A. O'Brien
Attorney May 23, 1933.    E. D. SMITH    1,910,935
DENTAL APPLIANCE
Filed Sept. 4, 1931    3 Sheets-Sheet 3
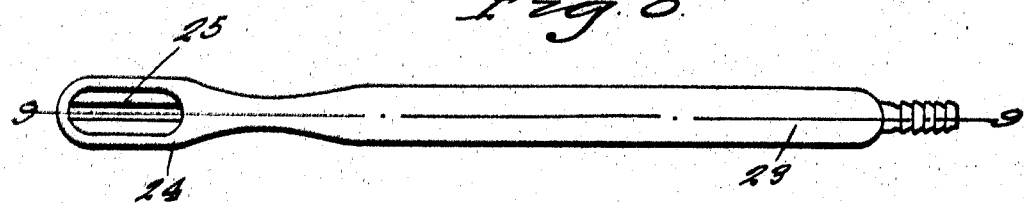
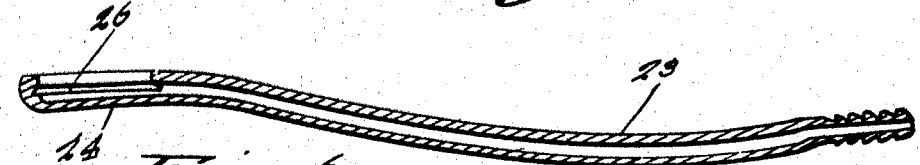
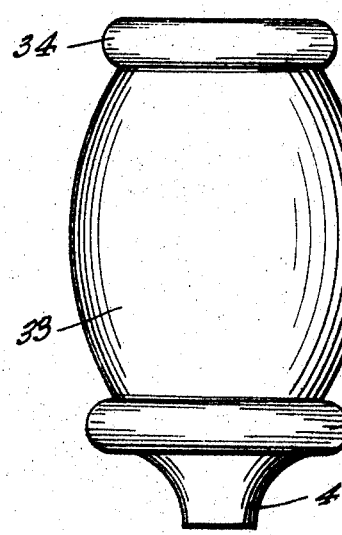
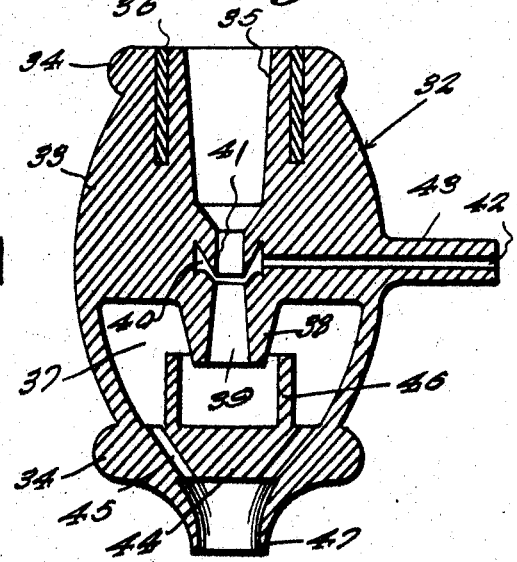
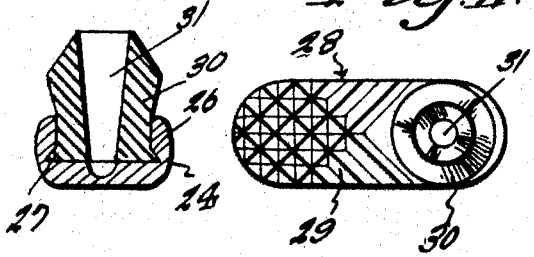
Inventor
Earl D. Smith
By Clarence A. O'Brien
Attorney Patented May 23, 1933

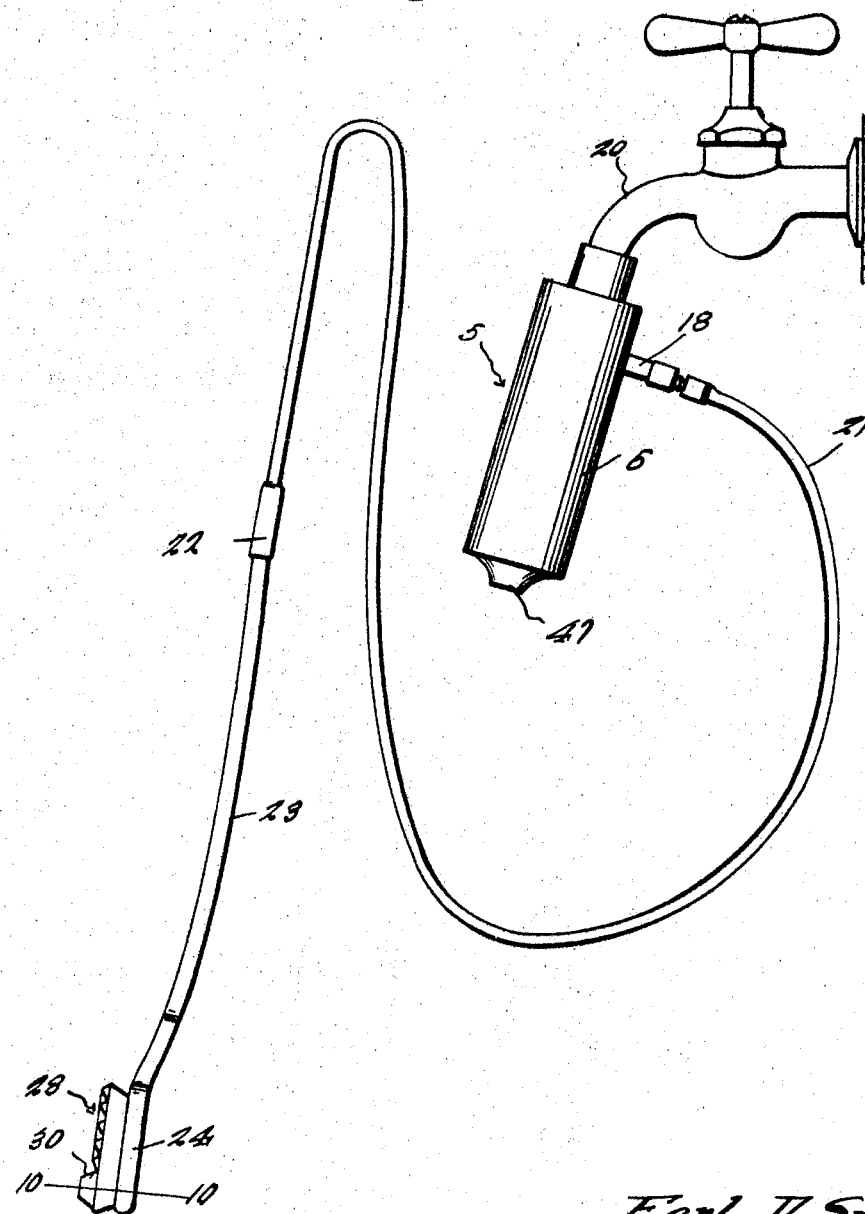

1,910,935

UNITED STATES PATENT OFFICE

EARL DONALD SMITH, OF ASHLAND, OHIO

DENTAL APPLIANCE

Application filed September 4, 1931. Serial No. 561,280.

This invention appertains to new and useful improvements in dentistry.

The principal object of this invention is to provide a dental utility which employs suction to remove foreign particles from between the teeth, as well as between the teeth and the gums.

Still another important object of the invention is to provide a hydraulic suction device adapted as a combination foreign particle remover and gum massager or invigorator.

Other important objects and advantages of the invention will become apparent to the reader of the following specification.

In the drawings:

Figure 1 represents a side elevational view of the preferred form of the invention.

Figure 2 represents a vertical sectional view through the suction pump.

Figure 3 represents an upper end elevational view of the pump.

Figure 4 represents a horizontal sectional view taken substantially on line 4—4 of Figure 2.

Figure 5 represents a cross sectional view taken substantially on line 5—5 of Figure 2.

Figure 6 represents a side elevational view of a slightly modified form of pump.

Figure 7 represents a longitudinal sectional view through a modification of the pump.

Figure 8 represents a top plan view of the holder.

Figure 9 represents a longitudinal sectional view taken substantially on line 9—9 of Figure 8.

Figure 10 represents a cross sectional view taken substantially on line 10—10 of Figure 1.

Figure 11 represents a top plan view of one of the resilient inserts.

Referring to the drawings wherein like numerals designate like parts, it can be seen that numeral 5 generally refers to the preferred form of the invention, which includes the cylinder 6 provided with a closed head 7 at its upper end, and a slightly depending lower end 8 through which the relatively large opening 9 (the same being a drain opening) extends to communicate the cavity 10 to the atmosphere.

Numeral 11 represents a horizontal partition above the cavity 10 which supports the upstanding barrel 12, the latter being open at its upper end and spaced laterally from the cylinder 6.

Depending into the barrel 12 and in spaced relation thereto from the head 7 is the nipple 13 provided with a conical shaped opening 14 therein opening through the lower end thereof. Numeral 15 represents a cavity with which the upper end of the conical shaped opening 14 communicates and into this cavity 15 descends the funnel like construction 16 at the lower end of the bore 17.

The nipple 18 projects laterally from the head 7 and has a duct 19 extending longitudinally therethrough and into the head to communicate with the cavity 7. It will now be seen that the entire device is constructed of some suitable, but preferably high grade resilient material such as vulcanized rubber.

The pump is to be engaged onto the faucet 20, with the faucet nozzle firmly fitting into the bore 17. The hose 21 is coupled to the nipple 18. This hose 21 is coupled as at 22 to the inner end of the elongated tubular handle 23 which is provided with a relatively broad head 24 at its outer end, the handle and head being constructed in the general nature of a toothbrush except that the handle and head are preferably of some suitable light metal with the head 24 provided with an elongated opening 25 therein.

The head 24 is provided with an internal groove 26, circumventing the opening 25 at the interior of the head and this groove 26 is to receive the flange 27 extending around the perimeter of the resilient insert generally referred to by numeral 28. This insert which may be of several different forms includes the roughened outer surface 29 and the upstanding bevelled boss 30 through which the opening 31 extends. This opening 31 extends completely through the bore and the insert so that when water is passing downwardly through the pump a vacuum is created in the tube 21 effecting a suction through the opening 31 of the boss 30 of the insert, so that all particles of foods and other foreign matter are removed from between the teeth and from between the teeth and the gums of the patient. The insert is preferably of composite material having some polishing ingredient distributed therein.

Numeral 32 generally refers to a slightly modified form of the invention (that is the pump feature), the same including a substantially egg-shaped body 33 provided with circumferentially extending enlargements 34 at the end thereof. The upper end of the body 34 has an inwardly extending bore 35, gradually decreasing inwardly in diameter to receive the nozzle of the faucet and imbedded in the body 33 and circumventing this bore 35 is a reinforcing band 36.

Numeral 37 represents a cavity into which depends the nipple 38 having an upwardly reducing opening 39 therein communicating at its upper end with the cavity 40 in the body 33. Depending into this cavity 40 is the funnel-like dependency 41, while extending from the cavity 40 is a duct 42, which also extends through the lateral nipple 43 on the body 33.

Numeral 44 represents a horizontal partition in the lower portion of the cavity 37 through which the small ducts 35 extend. This partition 44 supports the upstanding barrel 46 into which the lower end portion of the nipple 48 depends. On the lower end of the body 33 below the duct 45 is a downwardly tapering spout 47 also constructed of the resilient material of the body 33.

Manifestly, suction will be created in the same manner with the use of the device generally referred to by numeral 32.

While the foregoing specification sets forth the invention in specific terms, it is to be understood that numerous changes in the shape, size, and materials may be resorted to without departing from the spirit and scope of the invention as claimed hereinafter.

I claim:

As a new article of manufacture, a tooth and gum brush comprising a hollow handle adapted to be connected to a suction device, and a brushhead carried by the handle and formed of resilient material and having on its face a roughened brushing portion and also having on its face at one end of said brushing portion a tubular projection the inner end of which is in communication with the interior of the hollow handle and the outer end of which is open whereby in the use of the brush the teeth and gums will be subjected simultaneously to a brushing action and a suction action.

In testimony whereof I affix my signature.

EARL DONALD SMITH.